US011518856B2

(12) United States Patent
Vautard (10) Patent No.: US 11,518,856 B2
(45) Date of Patent: Dec. 6, 2022

(54) RUBBER COMPOSITIONS WITH REDUCED GRAPHENE OXIDE (71) Applicants: Compagnie Generale des Etablissements Michelin, Clermont-Ferrand (FR); Frederic Vautard, Greenville, SC (US)

(72) Inventor: Frederic Vautard, Greenville, SC (US)

(73) Assignee: Compagnie Generale des Etablissements Michelin, Clermont-Ferrand (FR)

(*) Notice: Subject to any disclaimer, the term of this patent is extended or adjusted under 35 U.S.C. 154(b) by 329 days.

(21) Appl. No.: 16/958,631

(22) PCT Filed: Dec. 20, 2018

(86) PCT No.: PCT/US2018/066861
§ 371 (c)(1),
(2) Date: Jun. 26, 2020

(87) PCT Pub. No.: WO2019/133442
PCT Pub. Date: Jul. 4, 2019

(65) Prior Publication Data
US 2021/0061962 A1 Mar. 4, 2021

Related U.S. Application Data (63) Continuation of application No. PCT/US2017/068462, filed on Dec. 27, 2017.

(51) Int. Cl.
C08J 3/22 (2006.01)
C08K 3/04 (2006.01)
B60C 1/00 (2006.01)
C08L 7/00 (2006.01)
C08L 9/00 (2006.01)
C08L 9/06 (2006.01)

(52) U.S. Cl.
CPC ............. *C08J 3/226* (2013.01); *B60C 1/0008* (2013.01); *B60C 1/0016* (2013.01); *C08K 3/042* (2017.05); *C08L 7/00* (2013.01); *C08L 9/00* (2013.01); *C08L 9/06* (2013.01); *C08K 2201/006* (2013.01); *C08K 2201/011* (2013.01)

(58) Field of Classification Search
CPC ...... C08J 3/226; B60C 1/0008; B60C 1/0016; C08L 7/00; C08L 9/00; C08L 9/06; C08K 3/042; C08K 2201/011; C08K 2201/006
See application file for complete search history.

(56) References Cited

U.S. PATENT DOCUMENTS

| 2011/0046289 A1* | 2/2011 | Zhamu | C08K 3/04 524/495 |
| 2013/0296479 A1* | 11/2013 | Martin | C08K 3/042 524/575.5 |
| 2014/0155544 A1* | 6/2014 | Du | C08K 3/04 524/575.5 |
| 2018/0215904 A1* | 8/2018 | Cesareo | B60C 1/0016 |

FOREIGN PATENT DOCUMENTS

CN 102942743 A 2/2013

OTHER PUBLICATIONS

International Search Report and Written Opinion, dated May 13, 2019.

* cited by examiner

Primary Examiner — Alexander C Kollias
(74) Attorney, Agent, or Firm — John Steckler Schwab (57) ABSTRACT Rubber components of a tire comprising a diene elastomer and at least 1 phr of reduced graphene oxide nanoparticles having a specific surface area of at least 700 m²/g, an oxygen content of no more than 6 at %, and a ratio of non-aromaticity to aromaticity $I_D/I_G$ of at least 0.7 as determined by Raman spectroscopy. Methods of preparing such rubber compositions in an internal mixer for achieving good distribution and dispersion are also included.

20 Claims, 2 Drawing Sheets

RUBBER COMPOSITIONS WITH REDUCED GRAPHENE OXIDE

BACKGROUND OF THE INVENTION

Field of the Invention

This invention relates generally to rubber compositions and more generally, to rubber compositions having reduced graphene oxide as a reinforcement filler and their methods of making.

Description of the Related Art

As those involved in the rubber industry are aware, rubber compositions are formed by mixing the many components that make up the rubber composition into a mixture that has all the components as well dispersed and distributed as possible. Failure to have each component well dispersed and distributed throughout the rubber composition will negatively impact the physical properties of the cured rubber composition.

There are many different means for mixing the components of rubber compositions. It is known, for example, to mix reinforcement fillers such as carbon black and silica with rubber latex (e.g., natural rubber particles dispersed in their liquid, commonly water) to gain an improved dispersion of the filler in the dried rubber. It is also known to mix components for rubber compositions in extruders. The most popular means for mixing rubber compositions in the rubber industry is the internal mixer, a well-known brand being the Banbury mixer.

Internal mixers for the tire industry are typically tangential having two slightly spiraled rotors that revolve side by side towards each other in a chamber formed like two adjacent short cylinders having adjacent sides open. Material is inserted within the chamber for mixing, and after mixing the bottom gate can be opened to drop the mixed contents. The operation and maintenance of such internal mixers of the Banbury type are well known and highly utilized in the tire industry, and researchers therefore seek to find useful materials that can be mixed into rubber compositions using internal mixers without the need to resort to other more costly mixing methods. Those materials that cannot be mixed in internal mixers may be found for that reason not to be useful in the tire industry.

SUMMARY OF THE INVENTION

Particular embodiments of the present invention include tires comprising a rubber component that comprises a rubber composition based upon a cross-linkable rubber composition. Other embodiments include methods for making such rubber compositions and tire components. One such disclosed tire comprises a rubber component comprising a rubber composition that is based upon a cross-linkable rubber composition having a diene elastomer and at least 1 phr of reduced graphene oxide nanoparticles comprising stacked platelets. The reduced graphene oxide particles may have a specific surface area that is at least 700 m$^2$/g, an oxygen content of no more than 8 at %, and a ratio of non-aromaticity to aromaticity $I_D/I_G$ of at least 0.7 as determined by Raman spectroscopy. Note that non-aromaticity and aromaticity may also be referred to as amorphous and crystalline carbon structure, respectively. Such rubber compositions may further include a curing system.

Particular embodiments of preparing a rubber composition for an article include placing a diene elastomer within a mixing chamber of an internal mixer and mixing the diene elastomer until it reaches a first predetermined temperature. Such embodiments may further include adding a portion of reduced graphene oxide to the mixing chamber and mixing the diene elastomer and particles of the reduced graphene oxide in the mixing chamber to form a mixture with the reduced graphene oxide particles incorporated into the mixture. The reduced graphene oxide particles may be described as having a specific surface area that is at least 700 m$^2$/g, an oxygen content of no more than 8 at %, and a ratio of non-aromaticity to aromaticity $I_D/I_G$ of at least 0.7 as determined by Raman spectroscopy.

Particular embodiments of such methods may include repeating adding a portion of a reduced graphene oxide to the mixing chamber and mixing the diene elastomer and the particles of the reduced graphene oxide in the mixing chamber to form a mixture with the reduced graphene oxide incorporated into the mixture as many times as necessary until a desired amount of the reduced graphene oxide has been added to the mixing chamber and heating the mixture by work performed by the internal mixer until it reaches a second predetermined temperature.

Such methods may further include dropping the mixture from the internal mixer, and cooling the mixture.

The foregoing and other objects, features and advantages of the invention will be apparent from the following more detailed descriptions of particular embodiments of the invention.

DETAILED DESCRIPTION OF PARTICULAR EMBODIMENTS

Particular embodiments of the present invention include rubber compositions having reduced graphene oxide particles distributed throughout the rubber composition to provide it with satisfactory rigidity and reinforcement. Particular embodiments further include methods for compounding such rubber compositions and articles that are formed of such compositions.

It is known that some types of graphene-based particles can be useful in rubber compositions but they are generally mixed into the rubber when the rubber is in a liquid phase, such as in a latex rubber. Such solution/latex blending is often used because it provides good dispersion and distribution of the particles throughout the matrix but has a major disadvantage of requiring further processing to remove and dispose of the liquid. Melt mixing is often used when the polymer is a thermoplastic, such as polyethylene, but is not of value in rubber compositions. The use of internal mixers, such as a Banbury mixer, to mix graphene-based particles, especially those that are in an agglomerate form, into rubber compositions is typically not successful because of its failure to obtain good dispersion of the particles throughout the rubber matrix.

The present invention has identified particular characteristics of reduced graphene oxide particles that provide an increase in both rigidity and reinforcement in the cured rubber compositions when the cross-linkable rubber compositions are mixed in a standard internal mixer. Such rubber compositions include reduced graphene oxide particles that have a specific surface area that is at least 700 m$^2$/g, has an oxygen content of less than 8 at %, and a ratio of non-aromaticity to aromaticity $I_D/I_G$ of at least 0.7 as determined by Raman spectroscopy. When the reduced graphene oxide particles fall outside this range of desired physical characteristics, the resulting rubber composition mixed in an internal mixer fails to gain adequate increase in rigidity, in reinforcement or in both due to its inability to disperse the material evenly throughout the rubber composition matrix. This failure to disperse is the result of the internal mixer being incapable of breaking down the agglomerates and aggregates of the reduced graphene oxide particles, so that even though the individual reduced graphene oxide particles themselves have a high aspect ratio, they aren't dispersed as particles in the rubber composition matrix where the high aspect ratio would be beneficial but instead remain in agglomerate or aggregate form where the advantage of the high aspect ratio is lost or at least greatly reduced.

In particular embodiments, the rubber compositions disclosed herein are useful for the manufacture of tire components including, for example, those components found in the tire sidewall, those found in the bead area, those found in the tire crown, for tire treads and for inner liners. Other useful articles that can be formed from such rubber compositions include, for example, conveyor belts, motor mounts, tubing, hoses and so forth. Particular embodiments of articles formed from such rubber compositions may be limited to at least a portion of the part of tire treads that contact the ground surface and in other embodiments may alternatively include the undertread or base, which is a layer of cushioning rubber under the ground-contacting portion of the tread. Such tread construction is known by those skilled in the art as cap and base construction. Useful tire treads may be manufactured from particular embodiments of the rubber compositions disclosed herein for passenger or light truck tires as well as, for example, heavy truck, aircraft tires, agricultural tires, mining tires and other tires, both pneumatic and nonpneumatic.

As used herein, "phr" is "parts per hundred parts of rubber by weight" and is a common measurement in the art wherein components of a rubber composition are measured relative to the total weight of rubber in the composition, i.e., parts by weight of the component per 100 parts by weight of the total rubber(s) in the composition.

As used herein, elastomer and rubber are synonymous terms.

As used herein, "based upon" is a term recognizing that embodiments of the present invention are made of vulcanized or cured rubber compositions that were, at the time of their assembly, uncured. The cured rubber composition is therefore "based upon" the uncured rubber composition. In other words, the cross-linked rubber composition is based upon or comprises the constituents of the cross-linkable rubber composition.

As noted above, particular embodiments of the rubber compositions disclosed herein include reduced graphene oxide particles having particular physical characteristics that provide a rubber composition with both increased rigidity and reinforcement and can be mixed into a rubber composition with internal mixers that are commonly found in the rubber industry, e.g., Banbury mixers.

Graphite is made up of stacked layers of graphene, each of the layers of graphene being made of a carbon atomic aromatic structure arranged in a honeycomb lattice. As is known, graphite can be expanded by intercalating graphite with sulfuric acid followed by an expansion generated by a thermal shock, e.g., by microwaving. The expanded intercalated graphite can then undergo milling, e.g., ball-milling, to break the expanded graphite up into particles of stacked graphene layers, as well as exfoliate it to some extent. The obtained particles are typically made of several stacked graphene layer, e.g., between 5 and 30 layers. Those particles may typically be referenced as exfoliated graphite nanoparticles.

The process of making reduced graphene oxide differs in some ways from the process of making exfoliated graphite nanoparticles. Starting with graphite, the graphite is first oxidized by putting the graphite through harsh oxidizing conditions. The most employed current method is the modified Hummers' method that consists of exposing graphite to a blend of sulfuric acid, potassium permanganate and sodium nitrate. The amount of oxidization through such methods can increase the oxygen content from less than 1 atomic percent to more than 30 atomic percent. Then the graphite oxide can be exfoliated to create graphene oxide nanoplatelets by exposing the graphite oxide to an expansion and exfoliation process generated by a thermal shock, e.g., by microwaving. The number of stacked graphene oxide platelets is then just a few, e.g., between 1 and 3 layers.

Then to create the reduced graphene oxide, the graphene oxide undergoes a reduction step either through a chemical route (use of a strong reducing agent like hydrazine) or a physical route (heat treatment at a high temperature in an inert atmosphere). After the graphite has undergone these steps of intercalating, oxidation, expansion, exfoliation and reduction, the resulting reduced graphite oxide no longer may be characterized as having its hexagonal atomic lattice structure since much of it has been at least in part destroyed. The reduced graphene oxide is typically in stacks of 1 to 3 layers.

The resulting structure of the reduced graphene oxide includes holes in the lattice with scattered islands of "hexagonal lattice" or "aromatic" structure all surrounded by amorphous carbon. Such structure can be observed using a High-Resolution Transmission Electron Microscope as described, for example, in the article *Determination of the Local Chemical Structure of Graphene Oxide and Reduced Graphene Oxide*, K. Erickson, et al., *Advanced Materials* 22 (2010) 4467-4472, which is fully incorporated herein. The breaking up of the lattice arrangement in the highly repetitive hexagonal form changes the shape of the platelets from being straight with sharp edges to wrinkly, bent shapes, because of the amorphous areas of the reduced graphene oxide and the aromatic areas that include defects as well (e.g., 5 or 7 carbon atom rings).

The change in the structure of the reduced graphene oxide over the graphene structure can be demonstrated in the change in their Raman spectrum. Raman spectroscopy can provide the structural fingerprint of a material in known manner and can measure the ratio of non-aromaticity to aromaticity $I_D/I_G$ of reduced graphene oxide. The "aromatic" portion includes that structure making up the hexagonal lattice typical of graphene while the non-aromaticity is the portion making up the areas damaged by the oxidation/reduction process to which the reduced graphene oxide has been subjected.

Figure 1:
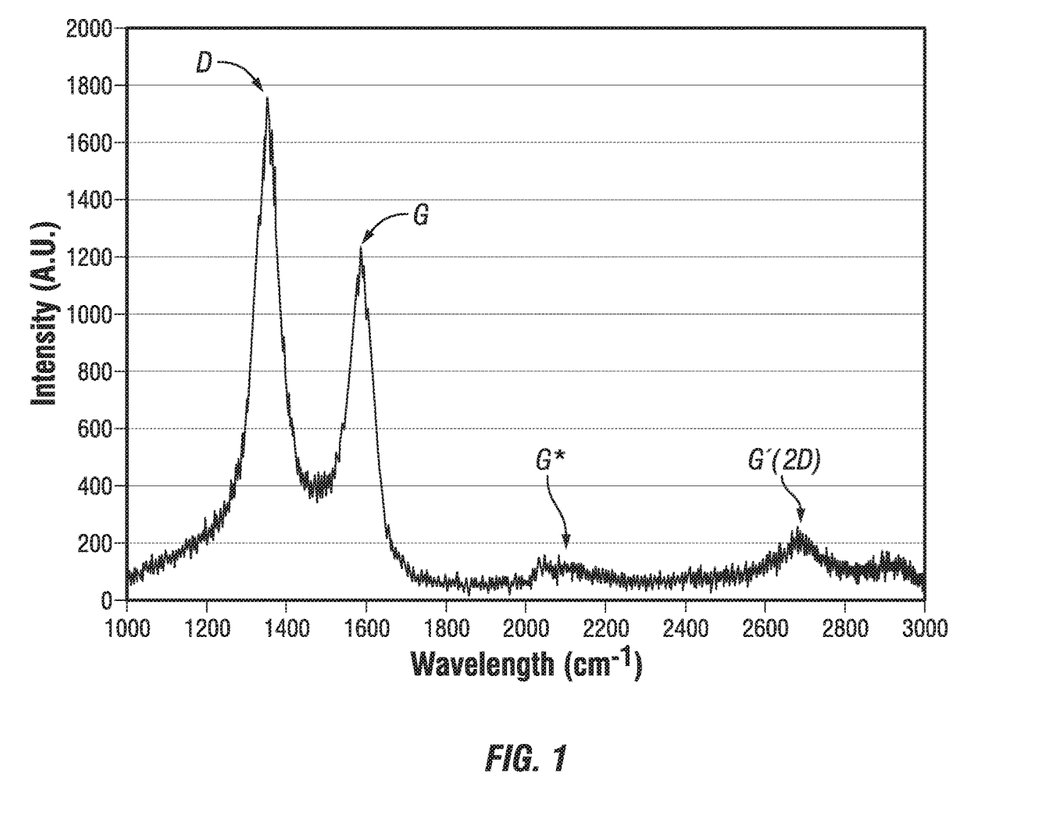
FIG. 1 shows the Raman spectra obtained from Raman spectroscopy on an exemplary sample of reduced graphene oxide.

FIG. 1 shows the Raman spectra obtained from Raman spectroscopy on an exemplary sample of reduced graphene oxide. The sample of reduced graphene oxide was N002 PDR available from Angstron Materials (Dayton, Ohio). Plotting wavelength against intensity, in known manner the area under the peak around 1600 cm$^{-1}$ ($I_G$) provides a measurement of the aromatic structure (or crystalline phase) and the area under the peak around 1350 cm$^{-1}$ ($I_D$) provides a measurement of the defects generated in the lattice of the graphene. It may be noted that the G* peak is due to hydrocarbon chains being present (e.g., perhaps solvent used to sonicate the material before drying) and that the 2D peak is indicative of the number of stacked layers.

Figure 2:
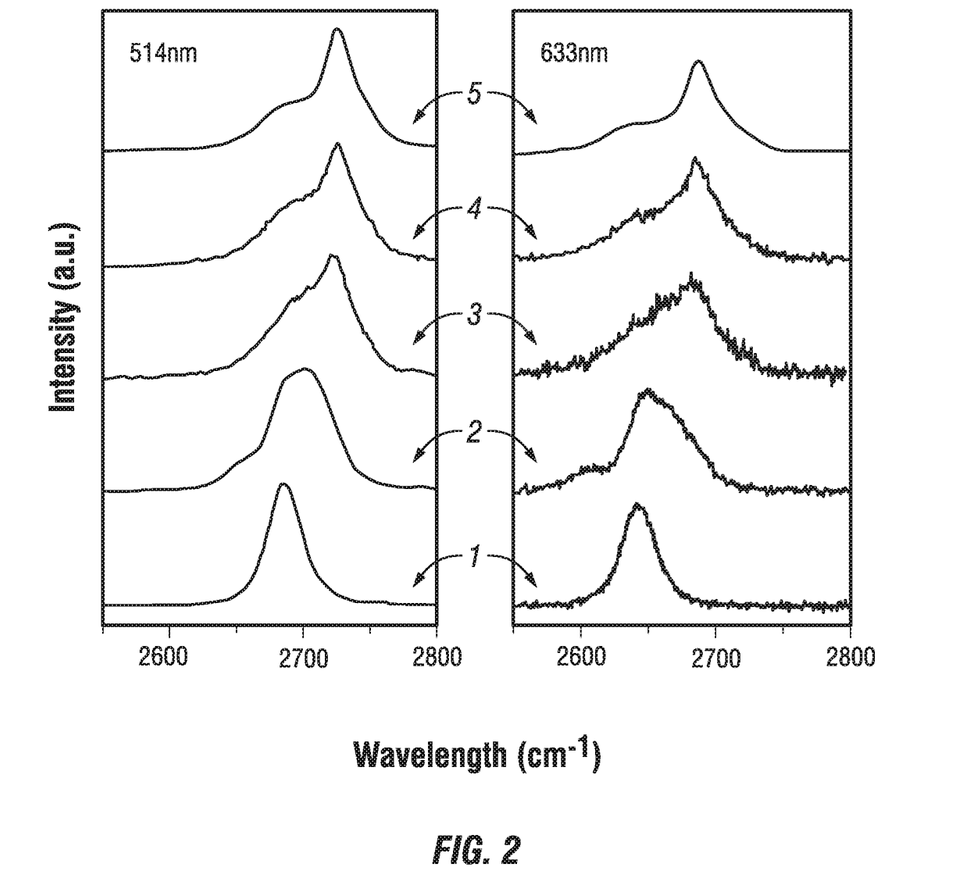
FIG. 2 shows the Raman spectra at 514 nm and 633 nm (wavelength of the incident laser of the Raman spectroscope) demonstrating the shifting spectra for differing number of layers in graphene as a useful means for measuring the number of stacked platelets.

FIG. 2 shows the Raman spectra at 514 nm and 633 nm (wavelength of the incident laser of the Raman spectroscope) demonstrating the shifting spectra for differing number of layers in graphene as a useful means for measuring the number of stacked platelets. As noted above, this occured in the area of the 2D peak shown in FIG. 1 and occured between 2600 and 2800 cm$^{-1}$. The spectra shifted with the number of layers in the graphene, with the lowest wavelength spectra 1 having one layer, then the next 2 having two layers, the next 3 having five layers, the next 4 having ten layers and the last spectra 5 being one for a graphite material.

A complete description of determining the number of stacked graphene layers can be found in the publication *Raman Spectrum of Graphene and Graphene Layers*, by J. C. Meyer, et al., published Oct. 30, 2006 in Physical Review Letters (2006) 187401, which is fully incorporated herein by reference for all it teaches. FIG. 2 is taken from this publication.

Graphene-like materials (i.e., materials made up of many layers of graphene) are readily available on the market. For example, Asbury Carbons with offices in New Jersey markets graphite nanoplatelets as product 2299 with a specific surface area of 400 m$^2$/g, a carbon content of 94 at %, an oxygen content of 4 at %, a ratio of non-aromaticity to aromaticity $I_D/I_G$ of 0.44, a platelet lateral size of 0.1 to 1 micron, and is in stacks of between 6 and 9 platelets. They also market Asbury Carbons 4119 with a specific surface area of 125 m$^2$/g, a carbon content of 99 at %, an oxygen content of 1 at %, a ratio of non-aromaticity to aromaticity $I_D/I_G$ of 0.36, a platelet lateral size of 0.4 to 2 micron, and is in stacks of between 18 and 25 platelets. XG Sciences with offices in Michigan markets an exfoliated graphite nanoplatelet product XGnP-M-5 that has a specific surface area of 105 m$^2$/g, a carbon content of 97 at %, an oxygen content of 3 at %, a ratio of non-aromaticity to aromaticity $I_D/I_G$ of 0.28, a platelet lateral size of 3-9 microns, and is in stacks of between 15 and 25 platelets. They have another exfoliated graphite nanoplatelet product XGnP-C-750 that has a specific surface area of 695 m$^2$/g, a carbon content of 95 at %, an oxygen content of 5 at %, a ratio of non-aromaticity to aromaticity $I_D/I_G$ of 0.41, a platelet lateral size of <1 micron, and is in stacks of between 3 and 10 platelets. Graphenea with offices in San Sebastian, Spain markets a reduced graphene oxide product Graphenea RGO that was reduced chemically rather than being reduced thermally. The other RGO products described below were reduced thermally, which in particular embodiments is a preferred RGO product for use in the rubber compositions disclosed herein. The Graphenea RGO has a specific surface area of 540 m$^2$/g, a carbon content of 90 at %, an oxygen content of 10 at %, a ratio of non-aromaticity to aromaticity $I_D/I_G$ of 1.65, a platelet lateral size of 4-7 micron, and is in stacks of between 1 and 3 platelets.

Vorbeck Materials with offices in Maryland markets a reduced graphene oxide product Vor-X that has a specific surface area of 350 m$^2$/g, carbon content of 92 at %, oxygen content of 5 at %, a ratio of non-aromaticity to aromaticity $I_D/I_G$ of 1.03, a platelet lateral size of 3-6 micron, and is in stacks of between 1 and 5 platelets. Angstron Materials with offices in Ohio has a reduced graphene oxide product N002 PDE that has a specific surface area of 830 m$^2$/g, a carbon content of 92-95 at %, an oxygen content of 8-5 at %, a ratio of non-aromaticity to aromaticity $I_D/I_G$ of 0.90, a platelet lateral size of 7-10 micron, and is in stacks of between 2 and 6 platelets.

They have another reduced graphene oxide product N002 PDR that is useful for the rubber composition disclosed herein that has a specific surface area of 855 m$^2$/g, a carbon content of 98 at %, an oxygen content of <1 at %, a ratio of non-aromaticity to aromaticity $I_D/I_G$ of 1.42, a platelet lateral size of 8-10 micron, and is in stacks of between 1 and 4 platelets.

It has been determined that in order to obtain suitable mixing characteristics in an internal mixer for a rubber composition that demonstrates suitable rigidity and reinforcement properties, particular embodiments of the rubber compositions disclosed herein have a reduced graphene oxide that has a surface area of at least 700 m$^2$/g or alternatively between 700 m$^2$/g and 1100 m$^2$/g, between 700 m$^2$/g and 900 m$^2$/g, between 750 m$^2$/g and 900 m$^2$/g or between 800 m$^2$/g and 900 m$^2$/g. In addition to these surface areas, reduced graphene oxide being suitable for particular embodiments include those with an oxygen content that is no more than 8 at % or alternatively no more than 6 at %, no more than 5 at %, no more than 2 at % or no more than 1 at %. Additionally suitable reduced graphene oxide particles have a ratio of non-aromaticity to aromaticity $I_D/I_G$ as measured by Raman spectroscopy of at least 0.7 or alternatively at least 1 or at least 1.3 or at least 1.4. In particular embodiments, such ratios may range between 0.7 and 4 or alternatively between 0.7 and 3, between 1 and 3, between 1.3 and 2 or between 1.4 and 3 or between 1.4 and 2.

The reduced graphene oxide particles that are suitable for particular embodiments of the rubber compositions disclosed herein may further be characterized as having a height of between 0.3 nm and 10 nm or alternatively between 0.3 nm and 8 nm, between 0.3 nm and 5 nm, between 0.3 nm and 3 nm or between 0.3 nm and 1 nm. It is recognized that typically a stack of three platelets is about 1 nm so a stack of about 9 platelets would have a height of about 3 nm. The length of such platelets may range between 0.1 micron and 15 microns or alternatively between about 1 micron and 12 microns or between 2 microns and 10 microns or between 5 microns and 10 microns. It is also noted that the reduced graphene oxide particles that are suitable for particular embodiments of the rubber compositions disclosed herein are provided in powder form having an aggregate size of less than about 60 microns or alternatively less than 60 microns or no more than 30 microns. Aggregates that are larger than these sizes do not mix well in an internal mixer and therefore the material is not well dispersed through the rubber composition matrix.

The dimensions of the reduced graphene oxide platelets can be determined in known manner by Transmission Electronic Microscopy (TEM). The TEM can accurately measure within 0.1 nm a reduced graphene oxide particle ultrasonically dispersed in a solvent (such as ethanol or isopropanol). The dimensions of the aggregates themselves, being in the range of tens of microns, such as between 10 microns and 50 microns, can be determined in known manner by Scanning Electron Microscopy (SEM). The dimensions (height and length) are the mean value of all the measured dimensions.

Specific surface area may be determined by adsorption of nitrogen and BET (Brunauer-Emmett-Teller) analysis in accordance with ASTM D6556. Oxygen and carbon atomic percentage can be determined by Energy Dispersive X-ray Spectroscopy with a Scanning Electron Microscope in accordance with ASTM E1508-12a.

Particular embodiments of the rubber compositions disclosed herein include between 0.5 phr and 15 phr of the reduced graphene oxide or alternatively between 0.5 phr and 12 phr, between 0.5 phr and 9 phr, between 2 phr and 12 phr, between 4 phr and 12 phr, or between 3 phr and 12 phr or between 3 phr and 7 phr of the reduced graphene oxide.

In addition to the reduced graphene oxide, particular embodiments of the rubber compositions disclosed herein further include a diene rubber. The diene elastomers or rubbers that are useful for such rubber compositions are understood to be those elastomers resulting at least in part, i.e., a homopolymer or a copolymer, from diene monomers, i.e., monomers having two double carbon-carbon bonds, whether conjugated or not.

These diene elastomers may be classified as either "essentially unsaturated" diene elastomers or "essentially saturated" diene elastomers. As used herein, essentially unsaturated diene elastomers are diene elastomers resulting at least in part from conjugated diene monomers, the essentially unsaturated diene elastomers having a content of such members or units of diene origin (conjugated dienes) that is at least 15 mol. %. Within the category of essentially unsaturated diene elastomers are highly unsaturated diene elastomers, which are diene elastomers having a content of units of diene origin (conjugated diene) that is greater than 50 mol. %.

Those diene elastomers that do not fall into the definition of being essentially unsaturated are, therefore, the essentially saturated diene elastomers. Such elastomers include, for example, butyl rubbers and copolymers of dienes and of alpha-olefins of the EPDM type. These diene elastomers have low or very low content of units of diene origin (conjugated dienes), such content being less than 15 mol. %.

Examples of suitable conjugated dienes include, in particular, 1,3-butadiene, 2-methyl-1,3-butadiene, 2, 3-di($C_i$-$0_5$ alkyl)-1,3-butadienes such as, 2, 3-dimethyl- 1, 3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene. Examples of vinyl-aromatic compounds include styrene, ortho-, meta- and para-methylstyrene, the commercial mixture "vinyltoluene", para-tert-butylstyrene, methoxystyrenes, chloro- styrenes, vinylmesitylene, divinylbenzene and vinylnaphthalene.

The copolymers may contain between 99 wt. % and 20 wt. % of diene units and between 1 wt. % and 80 wt. % of vinyl-aromatic units. The elastomers may have any microstructure, which is a function of the polymerization conditions used, in particular of the presence or absence of a modifying and/or randomizing agent and the quantities of modifying and/or randomizing agent used. The elastomers may, for example, be block, random, sequential or microsequential elastomers, and may be prepared in dispersion or in solution; they may be coupled and/or starred or alternatively functionalized with a coupling and/or starring or functionalizing agent.

Examples of suitable diene elastomers include polybutadienes, particularly those having a content of 1,2-units of between 4 mol. % and 80 mol. % or those having a cis-1,4 content of more than 80 mol. %. Also included are polyisoprenes and butadiene/styrene copolymers, particularly those having a styrene content of between 1 wt. % and 50 wt. % or of between 20 wt. % and 40 wt. % and in the butadiene faction, a content of 1,2-bonds of between 4 mol. % and 65 mol. %, a content of trans-1,4 bonds of between 20 mol. % and 80 mol. %. Also included are butadiene/isoprene copolymers, particularly those having an isoprene content of between 5 wt. % and 90 wt. % and a glass transition temperature (Tg, measured in accordance with ASTM D3418) of −40° C. to −80° C.

Further included are isoprene/styrene copolymers, particularly those having a styrene content of between 5 wt. % and 50 wt. % and a Tg of between −25° C. and −50° C. In the case of butadiene/styrene/isoprene copolymers, examples of those which are suitable include those having a styrene content of between 5 wt. % and 50 wt. % and more particularly between 10 wt. % and 40 wt. %, an isoprene content of between 15 wt. % and 60 wt. %, and more particularly between 20 wt. % and 50 wt. %, a butadiene content of between 5 wt. % and 50 wt. % and more particularly between 20 wt. % and 40 wt. %, a content of 1,2-units of the butadiene fraction of between 4 wt. % and 85 wt. %, a content of trans-1,4 units of the butadiene fraction of between 6 wt. % and 80 wt. %, a content of 1,2-plus 3,4-units of the isoprene fraction of between 5 wt. % and 70 wt. %, and a content of trans-1,4 units of the isoprene fraction of between 10 wt. % and 50 wt. %, and more generally any butadiene/styrene/isoprene copolymer having a Tg of between −20° C. and −70° C.

The diene elastomers used in particular embodiments of the present invention may further be functionalized, i.e., appended with active moieties. Examples of functionalized elastomers include silanol end-functionalized elastomers that are well known in the industry. Examples of such materials and their methods of making may be found in U.S. Pat. No. 6,013,718, issued Jan. 11, 2000, which is hereby fully incorporated by reference.

The silanol end-functionalized SBR used in particular embodiments of the present invention may be characterized as having a glass transition temperature Tg, for example, of between −50° C. and −10° C. or alternatively between −40° C. and −15° C. or between −30° C. and −20° C. as determined by differential scanning calorimetry (DSC) according to ASTM E1356. The styrene content, for example, may be between 15% and 30% by weight or alternatively between 20% and 30% by weight with the vinyl content of the butadiene part, for example, being between 25% and 70% or alternatively, between 40% and 65% or between 50% and 60%.

In summary, suitable diene elastomers for particular embodiments of the rubber compositions disclosed herein may include highly unsaturated diene elastomers such as polybutadienes (BR), polyisoprenes (IR), natural rubber (NR), butadiene copolymers, isoprene copolymers and mixtures of these elastomers. Such copolymers include butadiene/styrene copolymers (SBR), isoprene/butadiene copolymers (BIR), isoprene/styrene copolymers (SIR) and isoprene/butadiene/styrene copolymers (SBIR). Suitable elastomers may also include any of these elastomers being functionalized elastomers.

Particular embodiments of the present invention may contain only one diene elastomer and/or a mixture of several diene elastomers. While some embodiments are limited only to the use of one or more highly unsaturated diene elastomers, other embodiments may include the use of diene elastomers mixed with any type of synthetic elastomer other than a diene elastomer or even with polymers other than elastomers as, for example, thermoplastic polymers.

In addition to the reduced graphene oxide and the diene elastomer, particular embodiments of the rubber compositions disclosed herein may include a reinforcing filler to achieve additional reinforcing properties beyond those obtained from the reduced graphene oxide. Reinforcing fillers are well known in the art and any reinforcing filler may be suitable for use in the rubber compositions disclosed herein including, for example, carbon blacks and/or inorganic reinforcing fillers such as silica, with which a coupling agent is typically associated. Particular embodiments of the rubber compositions may include no additional reinforcing filler and rely only upon the reduced graphene oxide for reinforcement. Other embodiments may limit the reinforcing filler to just carbon black or to just silica or to a combination of these two fillers.

Examples of suitable carbon blacks are not particularly limited and may include N234, N299, N326, N330, N339, N343, N347, N375, N550, N660, N683, N772, N787, N990 carbon blacks. Examples of suitable silicas may include, for example, Perkasil KS 430 from Akzo, the silica BV3380 from Degussa, the silicas Zeosil 1165 MP and 1115 MP from Rhodia, the silica Hi-Sil 2000 from PPG and the silicas Zeopol 8741 or 8745 from Huber. If silica is used a filler, then a silica coupling agent is also required as is known in the art, examples of which include 3,3'-bis(triethoxysilyl-propyl) disulfide and 3,3'-bis(triethoxysilylpropyl) tetrasulfide (known as Si69).

In addition to the reduced graphene oxide, the diene elastomer and the optional reinforcing filler, particular embodiments of the rubber compositions include a curing system such as, for example, a peroxide curing system or a sulfur curing system. Particular embodiments are cured with a sulfur curing system that includes free sulfur and may further include, for example, one or more accelerators and one or more activators such as stearic acid and zinc oxide. Suitable free sulfur includes, for example, pulverized sulfur, rubber maker's sulfur, commercial sulfur, and insoluble sulfur. The amount of free sulfur included in the rubber composition is not limited and may range, for example, between 0.5 phr and 10 phr or alternatively between 0.5 phr and 5 phr or between 0.5 phr and 3 phr. Particular embodiments may include no free sulfur added in the curing system but instead include sulfur donors.

Accelerators are used to control the time and/or temperature required for vulcanization and to improve the properties of the cured rubber composition. Particular embodiments of the present invention include one or more accelerators. One example of a suitable primary accelerator useful in the present invention is a sulfenamide. Examples of suitable sulfenamide accelerators include n-cyclohexyl-2-benzothiazole sulfenamide (CBS), N-tert-butyl-2-benzothiazole sulfenamide (TBBS), N-Oxydiethyl-2-benzothiazole-sulfenamide (MBS) and N'-dicyclohexyl-2-benzothiazole sulfenamide (DCBS). Combinations of accelerators are often useful to improve the properties of the cured rubber composition and the particular embodiments include the addition of secondary accelerators.

Particular embodiments may include as a secondary accelerant the use of a moderately fast accelerator such as, for example, diphenylguanidine (DPG), triphenyl guanidine (TPG), diorthotolyl guanidine (DOTG), o-tolylbiguanidine (OTBG) or hexamethylene tetramine (HMTA). Such accelerators may be added in an amount of up to 4 phr, between 0.5 and 3 phr, between 0.5 and 2.5 phr or between 1 and 2 phr. Particular embodiments may include the use of fast accelerators and/or ultra-fast accelerators such as, for example, the fast accelerators: disulfides and benzothiazoles; and the ultra-fast accelerators: thiurams, xanthates, dithiocarbamates and dithiophosphates.

Other additives can be added to the rubber compositions disclosed herein as known in the art. Such additives may include, for example, some or all of the following: antidegradants, fatty acids, waxes, and curing activators such as stearic acid and zinc oxide. Examples of antidegradants include 6PPD, 77PD, IPPD and TMQ and may be added to rubber compositions in an amount, for example, of from 0.5 phr and 5 phr. Zinc oxide may be added in an amount, for example, of between 1 phr and 6 phr or alternatively, of between 1.5 phr and 4 phr. Waxes may be added in an amount, for example, of between 1 phr and 5 phr. Plasticizers, including process oils and plasticizing resins, may also be included in particular embodiments of the rubber compositions disclosed herein in amounts, for example, of between 1 phr and 50 phr.

As noted previously, the rubber compositions disclosed herein may be produced using internal mixers, such as a Banbury mixer, to fully disperse (break up the agglomerates) and distribute (homogenization) the components of the rubber composition through the matrix. Typically processes for preparing the rubber compositions use at least two preparation phases, a first phase of thermo-mechanical working at high temperature, followed by a second phase of mechanical working at a lower temperature.

Particular methods for preparing the rubber compositions disclosed herein include placing a diene elastomer within a mixing chamber of an internal mixer and mixing the diene elastomer until it reaches a first predetermined temperature. The first predetermined temperature may be, for example, between 90° C. and 100° C. The method may further comprise adding a portion of a reduced graphene oxide to the mixing chamber and mixing the diene elastomer and particles of the reduced graphene oxide in the mixing chamber to form a mixture with the reduced graphene oxide particles incorporated into the mixture. The method may continue with repeating adding a portion of a reduced graphene oxide to the mixing chamber and mixing the diene elastomer and the particles of the reduced graphene oxide in the mixing chamber to form a mixture with the reduced graphene oxide incorporated into the mixture as many times as necessary until a desired amount of the reduced graphene oxide has been added to the mixing chamber.

It should be noted that the reduced graphene oxide may be added to the mixing chamber in portions so that each amount can be mixed into the rubber composition without overfilling the mixing chamber of the internal mixer. By incorporating each portion of the reduced graphene oxide into the mixture after it is added to the mixing chamber, room is made available in the mixing chamber to add an additional portion of the reduced graphene oxide.

It may also be noted that particular embodiments may include forming a master batch with a diene elastomer and at least a portion of the reduced graphene oxide. As is known in the art, master batches include mixtures of components incorporated into an elastomer matrix that can be added to an internal mixer in predetermined portions. The various components that may have been incorporated into a master batch with the diene elastomer includes various reinforcement fillers, plasticizers, antidegradants, curing co-agents, accelerators, curing activators, antioxidants, fatty acids, waxes, and so forth as disclosed above. The curing agent (e.g., sulfur, peroxide) would not be included in such master batch.

Particular embodiments of the methods disclosed herein may further include heating the mixture by work performed by the internal mixer until it reaches a second predetermined temperature. As is known, the mixture in the internal mixer is heated as a result of the work performed on the mixture by the mixer's rotors. Typically the mixture is mixed until a predetermined temperature is reached. For particular embodiments disclosed herein, the second predetermined temperature may be, for example, between 120° C. and 165° C. or alternatively between 130° C. and 150° C. Such methods may further include dropping the mixture from the internal mixer and cooling the mixture. Such methods may further include adding additional components into the mixing chamber and mixing the additional components into the mixture. Such additional components may include, for example, any one or combination of reinforcing fillers such as carbon black and/or silica, antidegradants, antioxidants, accelerators, curing co-agents, curing activators, waxes, fatty acids and so forth as disclosed above.

Particular embodiments may further include adding a secondary filler to the mixer, wherein no more than 20% of the secondary filler is added until the desired amount of the reduced graphene oxide has been added to the mixing chamber. Alternatively there may be no more than 10% of the secondary filler added or none of the secondary filler added until the desired amount of graphene oxide has been added to the mixing chamber. In particular embodiments, it is preferable not to add the secondary filler until most or all of the reduced graphene oxide has been incorporated into the mixture. The secondary filler may be, for example, silica or carbon black or combinations thereof. In some embodiments, it may be just silica and in others, just carbon black.

After cooling of the mixture, a second phase of mechanical working is implemented at a lower temperature. Sometimes referred to as "productive" phase, this finishing phase consists of moving the mixture to an open mill and incorporating by mixing the vulcanization (or cross-linking) system (sulfur or other vulcanizing agent and accelerator(s)), in a suitable device, for example an open mill. It is performed for an appropriate time (typically between 1 and 30 minutes, for example between 2 and 10 minutes) and at a sufficiently low temperature lower than the vulcanization temperature of the mixture, so as to protect it against premature vulcanization.

The rubber composition can then be formed into useful articles, including tires and tire components, and cured.

The invention is further illustrated by the following examples, which are to be regarded only as illustrations and not delimitative of the invention in any way. The properties of the compositions disclosed in the examples were evaluated as described below and these utilized methods are suitable for measurement of the claimed properties of the claimed invention.

Modulus of elongation (MPa) was measured at 10% (MA10), 100% (MA100) and 300% (MA300) at a temperature of 23° C. based on ASTM Standard D412 on dumb bell test pieces. These measurements are true secant moduli in MPa, based on the original cross section of the test piece.

The elongation property was measured as elongation at break (%) and the corresponding stress at break (MPa), which is measured at 23° C. in accordance with ASTM Standard D412 on ASTM C test pieces.

Analysis of the level of aromaticity/crystallinity by Raman spectroscopy of graphene-like powders was carried out with an inVia™ confocal Raman microscope from Renishaw. The laser wavelength was 488 nm and its power was 10.5 mW. An objective of *100 was used. The grating configuration was 3000 1/mm. Spectra were obtained after a 20 second exposure time and for a wavelength of 1000-3000 cm$^{-1}$. The microscope was first calibrated to the SiC peak which wavelength is located at 776 cm$^{-1}$. The samples were run and the area under the two peaks located at 1600 cm$^{-1}$ (G peak) and at 1350 cm$^{-1}$ (D peak) was determined. The G peak is due to graphitic/aromatic plane vibrations with E2g symmetry. The D peak is due to a vibration with A 1g symmetry which exists only because of the disorder existing in the graphitic/aromatic lattice (increase of the ratio edge plans/basal plans, amorphous carbon, doping). A straight line was used as the base line. The two peaks were mixes of Gaussian and Lorentzian curves. The location of the two peaks was not fixed, so that the fitting could be as close as possible to the experimental spectra.

Analysis of atomic composition was determined by Energy Dispersive X-ray Spectroscopy (EDS) with a JEOLJSM-7100F Field Emission Scanning Electron Microscope (FESEM) and a JED-2300 Energy Dispersive X-Ray Analyzer. Graphene-like samples in powder form were homogeneously spread on some double sided carbon tape left at the top of a sample holder. Some pressure was gently applied to the powder with a spatula to compact it on the tape. The holder was turned upside down to remove any loose material that would contaminate the microscope chamber. For the EDS analysis, a magnification of 20,000 was used. An acceleration voltage of 1keV and a time of acquisition of 1 minute were chosen.

Thermal conductivity of a rubber mixed was measured based on the following equation:

$$a = \frac{\lambda}{\rho \times Cp}$$

a: thermal 4iffusi jtv (m$^2$/s) ρ: density (kg/m$^3$) Cp: heat (J/kg/K) λ: thernial conductivity (W/m/K), wherein the mix density was calculated based on its composition using the rule of mixtures applied to the densities of the individual components, the specific heat was measured by scanning differential calorimetry (SDC) and the thermal diffusivity was measure with a LFA 447 NanoFlash system from Netzsch.

Abrasion was measured in accordance with ASTM D5963-04 using an abrader from Gibitre Instruments. The sand paper grit was P60.

The maximum tan delta and the shear modulus at 10% G*10% dynamic properties for the rubber compositions were measured at 23° C. on a Metravib Model VA400 ViscoAnalyzer Test System in accordance with ASTM D5992-96. The response of a sample of vulcanized material (double shear geometry with each of the two 10 mm diameter cylindrical samples being 2 mm thick) was recorded as it was being subjected to an alternating single sinusoidal shearing stress at a frequency of 10 Hz under a controlled temperature of 23° C. Scanning was effected at an amplitude of deformation of 0.05 to 50% (outward cycle) and then of 50% to 0.05% (return cycle). The shear modulus G* at 10% was captured and the maximum value of the tangent of the loss angle tan delta (max tan δ) was determined during the return cycle.

Dynamic properties (tan delta and G*) for the rubber compositions were measured on a Metravib Model VA400 ViscoAnalyzer Test System in accordance with ASTM D5992-96. The response of a sample of vulcanized material (double shear geometry with each of the two 10 mm diameter cylindrical samples being 2 mm thick) was recorded as it was being subjected to an alternating single sinusoidal shearing stress of a constant 0.7 MPa and at a frequency of 10 Hz over a temperature sweep from −80° C. to 100° C. with the temperature increasing at a rate of 1.5° C./min. The shear modulus G* at 60° C. and the tan delta at 60° C. was captured at 0.7 MPa.

EXAMPLE 1

Rubber compositions were prepared using the components shown in Table 1. The amount of each component making up the rubber compositions shown in Table 1 are provided in parts per hundred parts of rubber by weight (phr). The SBR elastomer was 27% styrene with an Mn of 118,700 g/mol and the butadiene portion having 24% vinyl, 46% trans and 30% cis bonds. The accelerator was CBS and the protection system was 6PPD.

The particles and their properties are provided in Table 2. The length indicated in Table 2 is the length in microns of the platelets lateral size and the size indicated in Table 2 is the particle size in microns of the aggregate in powder form.

TABLE 1

| | Formulations, phr | | | | | | | | |
|---|---|---|---|---|---|---|---|---|---|
| Components | W1 | W2 | W3 | W4 | F1 | F2 | F3 | F4 | F5 |
| SBR | 100 | 100 | 100 | 100 | 100 | 100 | 100 | 100 | 100 |
| Particles | 27.1 | 27.1 | 27.1 | 27.1 | 5.7 | 5.7 | 12 | 5.7 | 5.7 |
| 6PPD | 2 | 2 | 2 | 2 | 2 | 2 | 2 | 2 | 2 |
| ZnO | 2 | 2 | 2 | 2 | 2 | 2 | 2 | 2 | 2 |
| Stearic Acid | 1.2 | 1.2 | 1.2 | 1.2 | 1.2 | 1.2 | 1.2 | 1.2 | 1.2 |
| Sulfur | 1.5 | 1.5 | 1.5 | 1.5 | 1.5 | 1.5 | 1.5 | 1.5 | 1.5 |
| CBS | 1.5 | 1.5 | 1.5 | 1.5 | 1.5 | 1.5 | 1.5 | 1.5 | 1.5 |

TABLE 2

| | Particles | | | | | | | |
|---|---|---|---|---|---|---|---|---|
| Particle Properties | Mix | SA $m^2/g$ | C at % | O at % | $I_D/I_G$ | Lgth μ | No. Stack | Size μ |
| Asbury Carbons 4119 | W1, W5, W9 | 125 | 99 | 1 | 0.36 | 0.4-2 | 18-25 | 10-80 |
| Asbury Carbons 2299 | W2, W6, W10 | 400 | 94 | 4 | 0.44 | 0.1-1 | 6-9 | 10-80 |
| XG Sciences XGnP-M-5 | W3, W7, W11 | 105 | 97 | 3 | 0.28 | 3-9 | 15-25 | 10-40 |
| XG Sciences XGnP-C-750 | W4, W8, W12 | 695 | 95 | 5 | 0.41 | <1 | 3-10 | 5-50 |
| Graphenea RGO* | F1 | 540 | 90 | 10 | 1.65 | 4-7 | 1-3 | 10-20 |
| Vorbeck Materials Vor-X | F2, F3, F6, F9 | 350 | 92 | 5 | 1.03 | 3-6 | 1-5 | 10-50 |
| Angstron Materials N002 PDE | F4, F7, F10 | 830 | 92-95 | 8-5 | 0.90 | 7-10 | 2-6 | 10-30 |
| Angstron Materials N002 PDR | F5, F8, F11 | 855 | 98 | <1 | 1.42 | 8-10 | 1-4 | 10-20 |

*Chemically Reduced

The rubber formulations were prepared by mixing the components given in Table 1, except for the sulfur and accelerator, in a Banbury mixer operating between 25 and 90 RPM until a temperature of between 130° C. and 165° C. was reached. The particles were added in several portions, each portion being separately mixed into the mixture before the next portion was added since the volume of the mixing chamber was not large enough to accommodate the addition of all the particles at once. The accelerators and sulfur were added in the second phase on a mill. Vulcanization was effected at 150° C. for the following times: W1, 30 minutes; W2, 30 minutes; W3, 40 minutes; W4 120 minutes, F1, 22 minutes; F2, 17 minutes; F3, 15 minutes; F4, 20 minutes; and F5, 25 minutes. The formulations were then tested to measure their physical properties, the results of which are shown in Table 3.

TABLE 3

| | Physical Properties | | | | | | | | |
|---|---|---|---|---|---|---|---|---|---|
| Physical Properties | W1 | W2 | W3 | W4 | F1 | F2 | F3 | F4 | F5 |
| MA10 @ 23° C. (MPa) | 2.6 | 2.7 | 6.2 | 2.2 | 2.4 | 4.4 | 6.0 | 6.9 | 8.6 |
| MA100 @ 23° C. (MPa) | 2.6 | 2.0 | 7.2 | 2.0 | 2.8 | 5.1 | 7.2 | 10 | 12.6 |
| MA300 @ 23° C. (MPa) | 4.5 | 3.1 | 8.9 | 3.0 | 5.6 | — | 10.8 | 20 | 19.9 |

TABLE 3-continued

| Physical Properties | | | | | | | | |
|---|---|---|---|---|---|---|---|---|
| Physical Properties | W1 | W2 | W3 | W4 | F1 | F2 | F3 | F4 | F5 |
| MA300/MA100 | 1.8 | 1.6 | 1.2 | 1.5 | 2.0 | — | 1.5 | 2.0 | 1.6 |
| Stress at Break @ 23° C., MPa | 6.4 | 7.2 | 7.1 | 4.1 | 5.9 | 6.2 | 8.6 | 15.6 | 15.2 |
| Strain at Break @ 23° C., % | 560 | 710 | 405 | 510 | 415 | 295 | 335 | 315 | 320 |
| G*(10%)@ 23° C., MPa | 1.3 | 1.4 | 1.5 | 2.2 | 1.3 | 1.7 | 3.3 | 2.3 | 3.1 |
| Max Tan Delta @ 23° C., MPa | 0.10 | 0.12 | 0.12 | 0.14 | 0.11 | 0.10 | 0.11 | 0.09 | 0.13 |
| G*60 @0.7, MPa | 1.1 | 1.0 | 1.2 | 1.5 | 1.1 | 1.5 | 2.7 | 1.6 | 2.5 |
| Tan Delta@ 60° C. | 0.09 | 0.15 | 0.10 | 0.18 | 0.10 | 0.07 | 0.09 | 0.08 | 0.09 |
| Abrasion Resistance | 88 | 75 | 51 | 57 | — | 65 | 72 | 100 | 81 |
| Thermal Conductivity, W/m · K | 0.285 | 0.292 | 0.332 | — | — | 0.188 | 0.229 | 0.189 | 0.229 |

As the results demonstrate in Table 3, the rigidity properties indicated by the modulus of elongation and the reinforcement properties indicated by the elongation properties were not suitable in the witness formulations even though the particle loading was much higher. The particles used in the witness formulations had much lower non-aromaticity to aromaticity ratios ($I_D/I_G$) that resulted in poorer mixing in the internal mixer.

EXAMPLE 2

Rubber formulations were prepared using the components shown in Table 4. The components are the same as used in Example 1 except that the SBR of Example 1 was replaced with BR in this Example. The BR had greater than 95% cis-bonds and a Tg of about −105° C. The formulations were prepared the same as those in Example 1 except as noted below. As compared to the formulations of Example 1, the XGnP-M-5 and Vor-X were increased in W7 and F6, respectively, to obtain a higher rigidity.

TABLE 4

| Formulations, phr | | | | | | | |
|---|---|---|---|---|---|---|---|
| Components | W5 | W6 | W7 | W8 | F6 | F7 | F8 |
| BR | 100 | 100 | 100 | 100 | 100 | 100 | 100 |
| Particles | 27.1 | 27.1 | 46.4 | 27.1 | 8.2 | 5.7 | 12 |
| 6PPD | 2 | 2 | 2 | 2 | 2 | 2 | 2 |
| ZnO | 2 | 2 | 2 | 2 | 2 | 2 | 2 |
| Stearic Acid | 1.2 | 1.2 | 1.2 | 1.2 | 1.2 | 1.2 | 1.2 |
| Sulfur | 1.5 | 1.5 | 1.5 | 1.5 | 1.5 | 1.5 | 1.5 |
| CBS | 1.5 | 1.5 | 1.5 | 1.5 | 1.5 | 1.5 | 1.5 |

Vulcanization was effected at 150° C. for the following times: W5, 20 minutes; W6, 30 minutes; W7, 30 minutes; W8 180 minutes, F6, 11 minutes; F7, 13 minutes; and F8, 14 minutes. The formulations were then tested to measure their physical properties, the results of which are shown in Table 5.

TABLE 5

| Physical Properties | | | | | | | |
|---|---|---|---|---|---|---|---|
| Physical Properties | W5 | W6 | W7 | W8 | F6 | F7 | F8 |
| MA10 @ 23° C. (MPa) | 3.2 | 2.6 | 12.6 | 3.8 | 6.2 | 5.6 | 6.6 |
| MA100 @ 23° C. (MPa) | 3.2 | 1.4 | 12.1 | 1.6 | 6.8 | 5.5 | 8.3 |
| MA300 @ 23° C. (MPa) | 5.1 | 2.1 | 12.7 | — | — | 9.3 | — |
| MA300/MA100 | 1.6 | 1.5 | 1.0 | — | — | 1.7 | — |
| Stress at Break @ 23° C., MPa | 4.7 | 2.4 | 9.4 | 0.6 | 5.6 | 7.1 | 8.4 |
| Strain at Break @ 23° C., % | 365 | 460 | 300 | 285 | 190 | 305 | 225 |
| G*(10%)@23° C., MPa | 1.5 | 1.6 | 1.8 | * | 2.3 | 2.0 | 2.3 |
| Max Tan Delta @ 23° C. | 0.13 | 0.17 | 0.14 | * | 0.05 | 0.06 | 0.06 |
| G*60 @0.7, MPa | 0.9 | 0.8 | 1.5 | * | 2.3 | 1.9 | 2.2 |
| Tan Delta@ 60° C., MPa | 0.12 | 0.19 | 0.13 | * | 0.04 | 0.04 | 0.04 |

* Not Measured

As shown in Table 5, the reduced graphene oxides of F6-F8 are more rigidifying than the graphene nanoparticles of the witness formulations. It is noted that the reduced graphene oxide having the lower oxygen content (F8) provided the higher rigidity and reinforcement when compared to the formulation F7. W7 shows high rigidity and good elongation properties but the ratio MA300/MA100 shows that there was no reinforcement.

EXAMPLE 3

Rubber formulations were prepared using the components shown in Table 6. The components are the same as used in Example 1 except that the SBR of Example 1 was replaced with NR in this Example. The formulations were prepared the same as those in Example 1 except as noted below. As compared to the formulations of Example 1, the Asbury Carbons 4119 and 2299 in W9 and W10 respectively were increased to obtain a higher rigidity.

TABLE 6

| Formulations, phr | | | | | | | |
|---|---|---|---|---|---|---|---|
| Components | W9 | W10 | W11 | W12 | F9 | F10 | F11 |
| NR | 100 | 100 | 100 | 100 | 100 | 100 | 100 |
| Particles | 46.4 | 46.4 | 46.4 | 27.1 | 8.2 | 5.7 | 5.7 |
| 6PPD | 2 | 2 | 2 | 2 | 2 | 2 | 2 |
| ZnO | 2 | 2 | 2 | 2 | 2 | 2 | 2 |
| Stearic Acid | 1.2 | 1.2 | 1.2 | 1.2 | 1.2 | 1.2 | 1.2 |

TABLE 6-continued

| | Formulations, phr | | | | | | |
|---|---|---|---|---|---|---|---|
| Components | W9 | W10 | W11 | W12 | F9 | F10 | F11 |
| Sulfur | 1.5 | 1.5 | 1.5 | 1.5 | 1.5 | 1.5 | 1.5 |
| CBS | 1.5 | 1.5 | 1.5 | 1.5 | 1.5 | 1.5 | 1.5 |

Vulcanization was effected at 150° C. for the following times: W9, 13 minutes; W10, 30 minutes; W11, 15 minutes; W12 40 minutes, F9, 7 minutes; F10, 9 minutes; and F11, 9 minutes. The formulations were then tested to measure their physical properties, the results of which are shown in Table 7.

TABLE 7

| | Physical Properties | | | | | | |
|---|---|---|---|---|---|---|---|
| Physical Properties | W9 | W10 | W11 | W12 | F9 | F10 | F11 |
| MA10 @ 23° C. (MPa) | 3.7 | 4.2 | 5.4 | 3.4 | 4.2 | 4.1 | 5.3 |
| MA100 @ 23° C. (MPa) | 4.6 | 3.1 | 6.9 | 2.2 | 6.3 | 5.2 | 8.8 |
| MA300 @ 23° C. (MPa) | 12.8 | 7.9 | — | 4.9 | 14.7 | 11.4 | 16.7 |
| MA300/MA100 | 2.8 | 2.5 | — | 2.2 | 2.3 | 2.2 | 1.9 |
| Stress at Break @ 23° C., MPa | 13.1 | 9.0 | 9.7 | 4.3 | 19.5 | 20.7 | 21.7 |
| Strain at Break @ 23° C., % | 540 | 400 | 275 | 345 | 525 | 635 | 545 |
| G*(10%)@ 23° C., MPa | 1.1 | 1.0 | 1.8 | 2.0 | 1.5 | 1.3 | 1.5 |
| Max Tan Delta @ 23° C. | 0.13 | 0.14 | 0.13 | 0.15 | 0.06 | 0.06 | 0.09 |
| G*60 @0.7, MPa | 0.7 | 0.6 | 1.3 | 1.0 | 1.2 | 1.1 | 1.2 |
| Tan Delta@ 60° C., MPa | 0.11 | 0.13 | 0.10 | 0.19 | 0.05 | 0.04 | 0.04 |

TABLE 8

| | Physical Properties at 100° C. | | |
|---|---|---|---|
| | W10 | W11 | F11 |
| MA100@100° C. (MPa) | 3.0 | 4.0 | 7.2 |
| MA300@100° C. (MPa) | — | 4.7 | 11.8 |
| MA300/MA100 | — | 1.2 | 1.6 |
| Stress at break@ 100° C. (MPa) | 3.7 | 3.7 | 13.2 |
| Strain at break@ 100° C. (%) | 270 | 345 | 545 |

A selection of the rubber formulations were further tested for static tensile properties at 100° C., at which temperature the crystallinity effects at lower temperatures on the physical properties of natural rubber are eliminated. These results are shown in Table 8.

It is noted that the natural self-reinforcement of NR due to its stress-induced crystallization can mislead the selection of filler. When testing the fillers at 23° C., it may appear that the witness formulations provide superior rigidity. However, when testing at 100° C., the true characterization becomes apparent.

EXAMPLE 4

Rubber formulations that included silica as an additional reinforcing filler were prepared using the components shown in Table 9. The SBR was the same as the SBR used in Example 1. The particles were Angstron Materials N002 PDR. The silica was Zeosil 1160 marketed by Solvay, a highly dispersible silica having a BET of 160 m²/g. The Si69 was the well-known silane coupling agent for silica; a bifunctional, sulfur containing organosilane marketed by Evonik.

TABLE 9

| | Formulations, phr | | | | | | | |
|---|---|---|---|---|---|---|---|---|
| Components | F12 | F13 | W13 | W14 | W15 | F14* | F15* | F16 |
| SBR | 100 | 100 | 100 | 100 | 100 | 100 | 100 | 100 |
| Particles | 2.4 | 6.0 | 0 | 0 | 0 | 3.2 | 3.2 | 8.0 |
| vol % | 1 | 2.5 | 0 | 0 | 0 | 1 | 1 | 2.5 |
| Silica | 0 | 0 | 45 | 42 | 37 | 42 | 42 | 37 |
| vol % | 0 | 0 | 16 | 15 | 13.5 | 15 | 15 | 13.5 |
| Si69 | 0 | 0 | 4.5 | 4.2 | 3.7 | 4.2 | 4.2 | 3.7 |
| DPG | 0 | 0 | 1.8 | 1.7 | 1.5 | 1.7 | 1.7 | 1.5 |
| 6PPD | 2.0 | 2.0 | 2.0 | 2.0 | 2.0 | 2.0 | 2.0 | 2.0 |
| ZnO | 2.0 | 2.0 | 2.0 | 2.0 | 2.0 | 2.0 | 2.0 | 2.0 |
| Stearic Acid | 1.2 | 1.2 | 1.2 | 1.2 | 1.2 | 1.2 | 1.2 | 1.2 |

TABLE 9-continued

| | Formulations, phr | | | | | | | |
|---|---|---|---|---|---|---|---|---|
| Components | F12 | F13 | W13 | W14 | W15 | F14* | F15* | F16 |
| Sulfur | 1.5 | 1.5 | 1.5 | 1.6 | 1.7 | 1.6 | 1.6 | 1.7 |
| CBS | 1.5 | 1.5 | 1.5 | 1.5 | 1.5 | 1.5 | 1.5 | 1.5 |

*Difference between F14 and F15 is only the order of adding fillers

The formulations were prepared the same as those in Example 1 except as noted below. Note that in the formulation F14, the silica was mixed into the rubber composition after the N002 PDR particles while in F15, the silica particles were mixed into the rubber composition before the N002 PDR. After curing, the samples were tested to determine the amplification factor. The results are shown in Table 10.

The increase in rigidity (or modulus) is explained by the local amplified strain of polymer chains between fillers and it increases as the filler phase increases in volume concentration (as it is non-deformable). The amplification factor is defined as $Modulus_{filled\ rubber} = Modulus_{unfilled\ rubber} *$ Amplification Factor. The factors are shown in Table 10.

The formulations in this Example provide an evaluation of the effect of the incorporation of reduced graphene oxide in a silica mix by comparing a reference formulation containing silica only with formulations having a portion of the silica replaced with N002 PDR at iso volume. Note that the sulfur content in the formulations was adjusted to compensate free sulfur coming from Si69. The content in DPG was adjusted based on the content in silica.

For each formulation the shear modulus was measured during a DMA measurement (strain sweep at 23° C.) at 50% strain (G*(50%)). The modulus of an unfilled reference was measured as well. The amplification factor could then be calculated for each mix as shown in Table 10. Since F14, F15, and F16 were hybrid mixes having both silica and N002 PDR particles, an amplification factor was calculated by summing the factors of the full silica mix with the full N002 PDR particle mix at iso-volume percent as shown in Table 10.

TABLE 10

Amplification Factors

|  | G*(50%), MPa (a) | G*(50%), MPa Unfilled, (b) | Amplification Factor, (a/b) | Amplification Factor, Sum |
|---|---|---|---|---|
| F12 | 1.23 | 0.66 | 1.86 (c) |  |
| F13 | 2.35 | 0.66 | 3.56 (e) |  |
| W13 | 2.01 | 0.66 | 3.05 |  |
| W14 | 1.93 | 0.66 | 2.92 (d) |  |
| W15 | 1.64 | 0.66 | 2.48 (f) |  |
| F14 | 3.09 | 0.66 | 4.68 | c + d = 4.78 |
| F15 | 2.95 | 0.66 | 4.47 | c + d = 4.78 |
| F16 | 4.15 | 0.66 | 6.29 | e + f = 6.04 |

As noted above, the difference between F14 and F15 was that in the formulation F14, the silica was mixed into the rubber composition after the N002 PDR particles while in F15, the silica particles were mixed into the rubber composition before the N002 PDR. This demonstrates that for particular embodiments of the methods disclosed herein, it is preferable not to mix the silica into the rubber composition prior to mixing in the reduced graphene oxide particles. The improved amplification factor of F16 over its summed amplification factor demonstrates the synergistic effect of the hybrid combined filler formulation.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular form of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention. Ranges that are described as being "between a and b" are inclusive of the values for "a" and "b."

It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

What is claimed is:

1. A method of preparing a rubber composition for an article, comprising:
   placing a diene elastomer within a mixing chamber of an internal mixer;
   mixing the diene elastomer until it reaches a first predetermined temperature;
   adding a portion of reduced graphene oxide to the mixing chamber and mixing the diene elastomer and particles of the reduced graphene oxide in the mixing chamber to form a mixture with the reduced graphene oxide particles incorporated into the mixture, wherein the reduced graphene oxide has a specific surface area that is at least 700 m$^2$/g, has an oxygen content of no more than 8 at %, and a ratio of non-aromaticity to aromaticity $I_D/IG$ of at least 0.7 as determined by Raman spectroscopy;
   repeating adding a portion of a reduced graphene oxide to the mixing chamber and mixing the diene elastomer and the particles of the reduced graphene oxide in the mixing chamber to form a mixture with the reduced graphene oxide incorporated into the mixture, repeating as many times as necessary until a desired amount of the reduced graphene oxide has been added to the mixing chamber;
   heating the mixture by work performed by the internal mixer until it reaches a second predetermined temperature;
   dropping the mixture from the internal mixer; and
   cooling the mixture to form a cooled mixture.

2. The method of claim 1, wherein the cooled mixture is a master batch, further comprising:
   placing the master batch into a mixing chamber of an internal mixer.

3. The method of claim 2, further comprising:
   adding additional components into the mixing chamber; and
   mixing the additional components into the mixture.

4. The method of claim 3, further comprising:
   adding a secondary filler to the mixer, wherein no more than 20% of the secondary filler is added until the desired amount of the reduced graphene oxide has been added to the mixing chamber.

5. The method of claim 4, wherein none of the secondary filler is added until the desired amount of the reduced graphene oxide has been added to the mixing chamber.

6. The method of claim 5, further comprising:
   mixing a curing agent into the cooled mixture.

7. The method of claim 6, further comprising:
   forming the article from the rubber composition; and
   curing the article.

8. The method of claim 7, wherein the step of forming the article further comprises:
   extruding the article.

9. The method of claim 1, further comprising:
   adding a secondary filler to the mixer, wherein no more than 20% of the secondary filler is added until the desired amount of the reduced graphene oxide has been added to the mixing chamber.

10. The method of claim 9, wherein none of the secondary filler is added until the desired amount of the reduced graphene oxide has been added to the mixing chamber.

11. The method of claim 1, further comprising:
    mixing a curing agent into the cooled mixture.

12. The method of claim 1, further comprising:
    forming the article from the rubber composition; and
    curing the article.

13. The method of claim 12, wherein the step of forming the article further comprises:
    extruding the article.

14. The method of claim 1, wherein the stacked platelets are stacked with no more than 5 platelets per stack.

15. The method of claim 14, wherein the stacked platelets are stacked with no more than 3 platelets per stack.

16. The method of claim 1, wherein the oxygen content of the reduced graphene oxide particles is no more than 1 at %.

17. The method of claim 1, wherein the reduced graphene oxide particles were reduced.

18. The method of claim 1, wherein the diene rubber is a highly unsaturated diene rubber having a content of diene origins (conjugated diene) that is greater than 50 mol %.

19. The method of claim 18, wherein the diene rubber is selected from the group consisting of natural rubber (NR), polyisoprene rubber (IR), polybutadiene rubber (BR), styrene-polybutadiene copolymer (SBR) and combinations thereof.

20. The method of claim 1, wherein the article is a tire component.

* * * * *